US010757544B1

(12) United States Patent
Schweinfurth et al.

(10) Patent No.: US 10,757,544 B1
(45) Date of Patent: *Aug. 25, 2020

(54) PUSH-BASED COMMUNICATIONS SYSTEMS AND METHODS FOR TRANSMITTING PUSH-BASED COMMUNICATIONS ASSOCIATED WITH PRODUCTS

(71) Applicant: WALGREEN CO., Deerfield, IL (US)

(72) Inventors: Andrew Schweinfurth, Chicago, IL (US); Lindsey Kanefsky, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,475

(22) Filed: Mar. 26, 2020

Related U.S. Application Data

(63) Continuation of application No. 16/688,423, filed on Nov. 19, 2019, which is a continuation of application No. 16/052,050, filed on Aug. 1, 2018, now Pat. No. 10,531,245.

(51) Int. Cl.
   *H04W 4/14* (2009.01)
   *H04L 12/58* (2006.01)
   *G06Q 10/08* (2012.01)
   *H04W 4/029* (2018.01)

(52) U.S. Cl.
   CPC .......... *H04W 4/14* (2013.01); *G06Q 10/0835* (2013.01); *H04L 51/38* (2013.01); *H04W 4/029* (2018.02)

(58) Field of Classification Search
   CPC ........ H04W 4/14; H04W 4/029; H04L 51/38; G06Q 10/0835
   USPC ...................................................... 455/456.3
   See application file for complete search history.

(56) References Cited

U.S. PATENT DOCUMENTS

| 6,748,320 B2 * | 6/2004 | Jones ..................... G06Q 10/08 340/989 |
| 10,142,430 B1 * | 11/2018 | Onnen .................. H04W 68/00 |
| 2007/0083410 A1 * | 4/2007 | Hanna ................ G06Q 10/0835 705/333 |
| 2011/0029598 A1 * | 2/2011 | Arnold .................... H04L 67/26 709/203 |

(Continued)

*Primary Examiner* — William Nealon
(74) *Attorney, Agent, or Firm* — Marshall, Gerstein & Borun LLP; Randall G. Rueth

(57) ABSTRACT

Systems and methods are described for transmitting a plurality of push-based communications associated with products moving geographically. In various aspects, an application programming interface (API) endpoint server having a push-based API, the push-based API associated with a webhook provided to a delivery service server, may receive via a webhook-push following an update to a delivery status state of a delivery event. The webhook-push includes information associated with the delivery event. A short message service (SMS) webpage server may generate a description of the update to the delivery status state. The SMS webpage server may be further configured to generate an SMS-based webpage including an image of an operator of a mobile delivery vehicle. An SMS delivery component may transmit a communication including the description of the update to a client device associated with the delivery event.

20 Claims, 5 Drawing Sheets

(56) References Cited

U.S. PATENT DOCUMENTS

| | | | |
|---|---|---|---|
| 2012/0030133 A1* | 2/2012 | Rademaker | G06Q 10/08 |
| | | | 705/333 |
| 2014/0067708 A1* | 3/2014 | Lau | H04L 67/18 |
| | | | 705/333 |
| 2016/0034848 A1* | 2/2016 | Wheelock | G06Q 10/0833 |
| | | | 705/333 |
| 2016/0034850 A1* | 2/2016 | Lehner | G06Q 10/08 |
| | | | 705/340 |
| 2016/0149848 A1* | 5/2016 | Vembu | H04L 51/36 |
| | | | 709/206 |
| 2017/0018596 A1 | 1/2017 | Kitamura | |
| 2017/0124511 A1* | 5/2017 | Mueller | G06Q 30/0635 |
| 2017/0132627 A1* | 5/2017 | Phillips | G06Q 20/401 |
| 2017/0154347 A1* | 6/2017 | Bateman | G06Q 40/08 |
| 2017/0185961 A1* | 6/2017 | Shiryan | H04W 4/80 |
| 2018/0270785 A1* | 9/2018 | Hall | H04W 4/14 |

* cited by examiner

PUSH-BASED COMMUNICATIONS SYSTEMS AND METHODS FOR TRANSMITTING PUSH-BASED COMMUNICATIONS ASSOCIATED WITH PRODUCTS

CROSS-REFERENCE TO RELATED APPLICATIONS

This is a continuation of U.S. patent application Ser. No. 16/688,423, filed Nov. 19, 2019, which is a continuation of U.S. patent application Ser. No. 16/052,050, filed Aug. 1, 2018, the entire disclosures of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present disclosure generally relates to push-based systems and methods, and, in particular, to push-based communications systems and methods for transmitting push-based communications associated with products moving geographically.

BACKGROUND

Individuals often have a variety of prescriptions filled at a pharmacy. An individual with a prescription may have difficulty traveling to a pharmacy in order to pick up their prescription due to a medical ailment, their age, or their distance from the pharmacy. However, such potential pharmacy customers can be reticent to order a prescription delivery due to concerns about the safety and security of their delivery. Given the vital importance of prescriptions to an individual's health, a customer may be uncomfortable with not personally picking up a prescription directly from the pharmacy. Thus, customers may not take advantage of a delivery service due to a lack of information. The customer is therefore unable to receive their prescription, while the pharmacy is denied access to the market of would-be customers.

Accordingly, there is a need for systems and methods of transmitting push-based communications associated with products moving geographically to client devices that alleviate these issues.

BRIEF SUMMARY

Customers receiving products, e.g., pharmaceutical products, as delivered via the systems and methods described herein would benefit from the convenience of receiving their prescription via a delivery. The embodiments of the present disclosure are directed to systems and methods for transmitting push-based communications associated with products moving geographically, which provide users with contextual information about a delivery and increase the likelihood a user will choose to have a product, such as a prescription, delivered.

Accordingly, in various embodiments provided herein, systems and methods for transmitting push-based communications are described including an application programming (API) interface having a push-based API. The push-based API may be associated with a webhook provided to a delivery service server. The push-based API may be configured to receive a webhook-push pushed to the API endpoint server from the delivery service server via the webhook following an update to a delivery status state of a delivery event. A short message server (SMS) webpage server may be configured to receive the webhook-push pushed to the SMS webpage server from the API endpoint server. The SMS webpage server may be configured to generate a description of the update to the delivery status state. In addition, an SMS delivery component may be configured to transmit a communication that includes the description of the update to the delivery status state to a client device associated with the delivery event.

In various embodiments, a method for transmitting a plurality of push-based communications associated with products moving geographically is provided. The method may include receiving a webhook-push at an API endpoint server, the API endpoint server having a push-based API associated with a webhook provided by a delivery service server. The webhook-push may be pushed to the API endpoint server from the delivery service server via the webhook following an update to a delivery status state of a delivery event. The method may further include receiving, at an SMS webpage server, the webhook-push pushed to the SMS webpage server from the API endpoint server. In addition, the method may further include generating a description of the update to the delivery status state via the SMS webpage server and transmitting a communication by an SMS delivery component. The communication may include a description of the update to the delivery status state to a client device, wherein the client device may be associated with the delivery event.

In some embodiments, a tangible, non-transitory computer-readable medium storing instructions for transmitting a plurality of push-based communications associated with products moving geographically is provided. When the instructions are executed via one or more processors of a computer system, the instructions cause the computer system to receive an webhook-push at an API endpoint server. The API endpoint server may have a push-based API associated with a webhook provided to a delivery service server. The webhook-push may be pushed to the API endpoint server from the delivery service server via the webhook following an update to a delivery status state of a delivery event. In addition, the instructions may cause the computer system to receive the webhook-push at an SMS webpage server, the webhook-push pushed to the SMS webpage server from the API endpoint server. The instructions may further cause the computer system to generate a description of the update to the delivery status state via the SMS webpage server and to transmit a communication by an SMS delivery component. The communication may include a description of the update to the delivery status state to a client device, wherein the client device may be associated with the delivery event.

In some embodiments, the SMS webpage server may further be configured to generate an SMS-based webpage based on the webhook-push, the SMS-based webpage having a uniform resource locator (URL). The URL may be based, for example, on a delivery event identification included in the webhook-push. In such embodiments, the description of the update to the delivery status state may also include the URL of the SMS-based webpage. In various embodiments, the SMS-based webpage may include, for example, an image, name, and/or identifier of an operator of a mobile delivery vehicle associated with the delivery event. In still further embodiments, the SMS-based webpage may be configured to include a plurality of meta tags such that when the communication including the URL of the SMS-based webpage is displayed by the client device, the communication includes a preview of the SMS-based webpage in accordance with the meta tags. At least one of the meta tags may be, for example, a URL associated with an image of the operator of the mobile delivery vehicle associated with the delivery event.

In various embodiments, the webhook may be provided to the delivery service server via the push-based API. In further embodiments, the webhook-push may be pushed to the SMS webpage server from the API endpoint server via the push-based API. The webhook-push may include a delivery status state. The delivery status state can be one of several designations, including assigned, in_transit, delivered, returned, canceled, or driver_arrived_at_origin. In some embodiments, for example, the delivery event may be associated with a delivery of a product and the update to the delivery status state may be associated with a change in the geographic location of the product. In several embodiments, the webhook-push may include a name or identifier of an operator of a mobile delivery vehicle associated with the delivery event. The webhook-push may also include a URL associated with an image of the operator of the mobile delivery vehicle associated with the delivery event. In further embodiments, the webhook-push may include an estimated delivery time associated with the delivery event.

In some embodiments, the delivery event may be associated with a delivery from a pharmacy. In still further embodiments, the delivery event may be associated with a delivery of a controlled substance and/or an over-the-counter drug. The delivery event may also be associated with a same-day delivery event, such as a delivery that is scheduled to occur on the same day that the delivery is requested.

The SMS delivery component may be further configured to receive from the SMS webpage server the description of the update to the delivery status state. In some embodiments, the SMS delivery component may comprise an SMS layer that is configured to receive content from a plurality of sources including the SMS webpage server and to transmit communications based on the content. In further embodiments, the SMS delivery component may include a third-party SMS delivery component that is configured to transmit the communication to the client device associated with the delivery event. In various embodiments, the communication may include an email and/or SMS message. In still further embodiments, the SMS delivery component may be further configured to transmit the communication to the client device via a secure channel.

In various embodiments, the delivery event may be initiated following a prediction that a user associated with the client device is interested in receiving a delivery. In such embodiments, the prediction may be determined using a rules-based algorithm and/or machine-learning.

Various benefits arise from the systems and methods for transmitting push-based communications as described herein. The transmitted communications provide users that have requested a delivery event contextual information about the delivery. The push-based communications may include a textual description of an update to the delivery status state of a delivery event. The description may include, for example, the name or identifier of the operator, such as a driver, of a mobile delivery vehicle associated with a delivery event, and a description of the status of the user's delivery event, such as whether a delivery is in transit. In this way, the push-based communications inform a user what the operator and/or the mobile delivery vehicle looks like before the operator arrives at the user's location and keep the user apprised of their delivery as it changes status. This information alleviates concerns users have about the safety and security of their delivery. In the context of prescription deliveries, such concerns can be high enough to prevent a user from requesting a delivery. The comfort provided by communications containing contextual information about a delivery encourages users to request delivery of prescriptions.

Moreover, the embodiments of the present disclosure provide to a retailer, such as a pharmacy, systems and methods to efficiently provide these push-based communications to a user that has requested a delivery event. The systems and methods described herein allow a user to receive information from a trusted retailer with which they have placed a delivery event request, rather than an unfamiliar source. Because the information contained within the communications alleviates concerns users have about the safety and security of their delivery, users are more likely to feel comfortable requesting a delivery event and more likely to interact with the retailer via a digital interface. If the customer is notified of delivery status updates and can receive their products via delivery rather than needing to travel to a retail store, the customer will have a better experience and will be more likely to be a repeat customer. Further, increasing a retailer's digital customer user base and feature set grows the retailer's business both in the store and online. Customers that interact with a retailer or retail store through a digital channel generally spend six times more than the customer otherwise would have merely interacting with the physical retail store.

In accordance with the above, and with the disclosure herein, the present disclosure includes improvements in computer functionality or in improvements to other technologies at least because the claims recite, e.g., push-based communications systems and methods for transmitting a plurality of push-based communications associated with products moving geographically. That is, the present disclosure describes improvements in the functioning of the computer itself or "any other technology or technical field" because the present disclosure describes improving and configuring an application programming interface (API) endpoint server, a short message service (SMS) webpage server, and an SMS delivery component.

The present disclosure includes specific features other than what is well-understood, routine, conventional activity in the field, or adding unconventional steps that confine the claim to a particular useful application, e.g., push-based communications systems and methods for transmitting a plurality of push-based communications associated with products moving geographically.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

Figure 1:
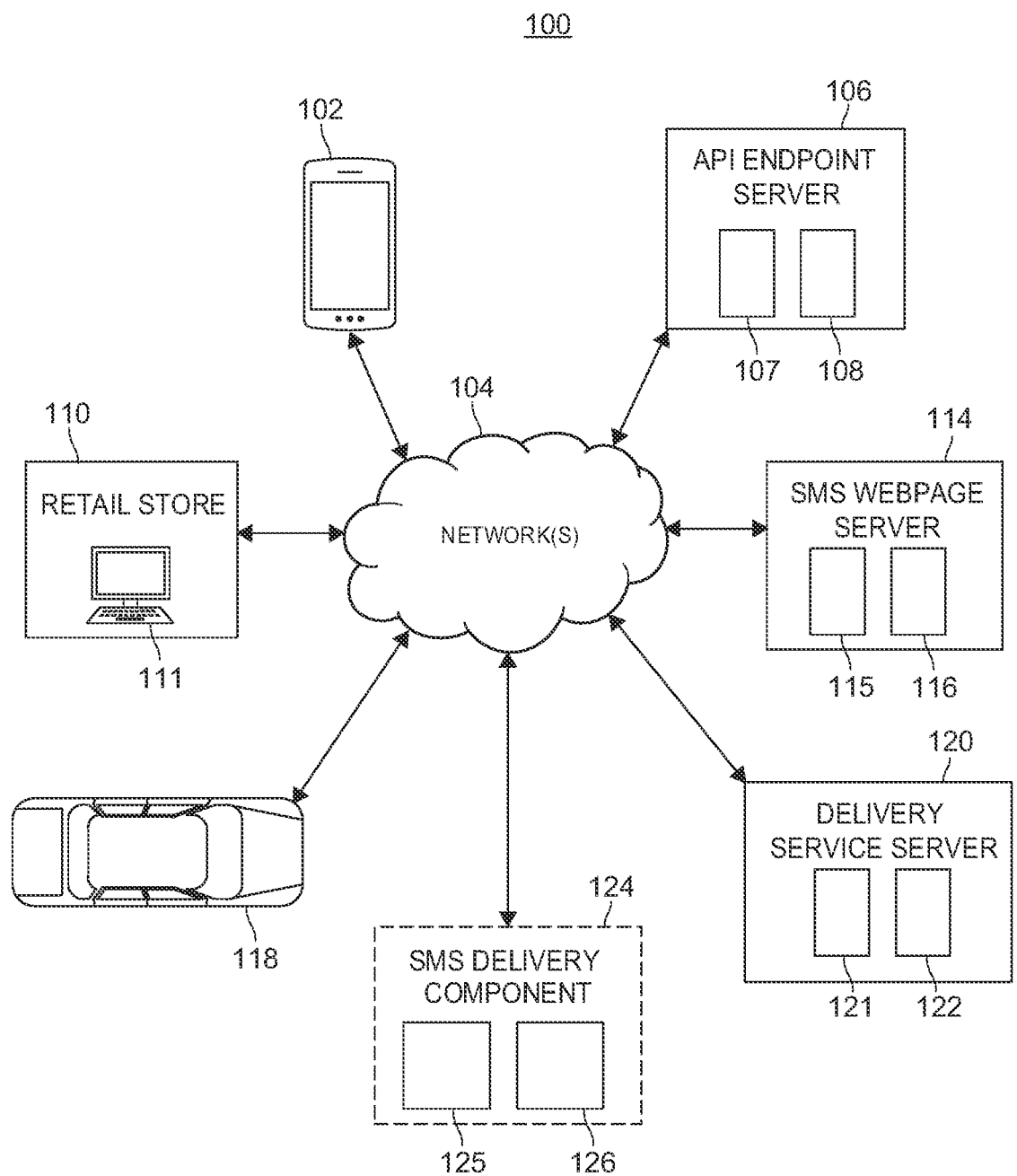
FIG. 1 illustrates an example network diagram depicting push-based communications systems and methods in accordance with various embodiments disclosed herein.

FIG. 1 illustrates an example network diagram 100 depicting push-based communications systems and methods in accordance with various embodiments disclosed herein. Network diagram 100 includes several online, electronic devices for facilitating the systems and methods for transmitting push-based communications as described herein. It should be appreciated that the network diagram 100 is merely an example embodiment and that alternative or additional embodiments are envisioned.

As illustrated in FIG. 1, the network diagram 100 includes a client device 102. Client device 102 may be associated with a user. The user may be an individual or person who may be interested in purchasing products or services that may be offered by a retailer having at least one retail store, such as retail store 110. The retailer may be, for example, a pharmaceutical store chain and the products and services offered by the retailer may include over-the-counter medications, controlled substances, and filling of prescriptions. Retail store 110 may be, for example, a pharmacy of the pharmaceutical store chain.

In the embodiment of FIG. 1, client device 102 is communicatively coupled to one or more network(s) 104 (e.g., the Internet). Client device 102 may be any type of electronic device such as a mobile device (e.g., a smartphone), notebook computer, tablet, phablet, and the like. Client device 102 may include one or more processors, one or more memories, and/or one or more network interfaces (wired and wireless) for communicating across network(s) 104. Client device 102 may implement a mobile platform or operating system such as Apple iOS, Google Android, or Microsoft Windows. Client device 102 may communicate via network(s) 104 over any of a wired connection or a wireless connection.

Client device 102 may be configured to communicate with other components of network diagram 100 over one or more network(s) 104. In various embodiments, network(s) 104 may support any suitable type of data communication via any suitable standard or technology (e.g., GSM, CDMA, TDMA, WCDMA, UMTS, LTE, EDGE, OFDM, GPRS, EV-DO, UWB, Internet, IEEE 802 including Ethernet, WiMAX, Wi-Fi, Bluetooth, and others). Accordingly, network(s) 104 may include one or more wired connections and/or one or more wireless connections. Network(s) 104 may include one or more public networks (e.g., the Internet) and/or one or more private networks (e.g., private intranet(s)).

The retail store 110 of the retailer may include a computer or set of computers 111 or terminals associated therewith that may support a checkout procedure or a point of sale. Computer(s) 111 may be communicatively coupled to network(s) 104. In particular, an employee of retail store 110 may interact with computer(s) 111 in order to communicate with the components of network diagram 100 via network(s) 104. For example, the retail store 110 may be a pharmacy and the employee may be a pharmacist or pharmacy technician that fills and manages a prescription using computer(s) 111. Computer(s) 111 may also be associated with a retailer but located outside of a physical retail store 110 location.

The network diagram 100 may further include an application programming interface (API) endpoint server 106 communicatively coupled to network(s) 104. API endpoint server 106 may be associated with a retailer, such as a pharmaceutical store chain, associated with retail store 110. For example, API endpoint server 106 may be outside of a firewall of the retailer and communicatively coupled to servers within the firewall of the retailer by network(s) 104. API endpoint server 106 may include one or more processors 107, memories 108, and/or network interfaces. API endpoint server 106 may also have one or more APIs, including at least one push-based API. The push-based API may be configured to receive via network(s) API a push comprising data from another component of network diagram 100. For example, a push may include a webhook-push pushed from delivery service server 120, as will be described below with respect to FIG. 2. The API(s) may be implemented as, for example, a Representational State Transfer (RESTful) API where external devices (e.g., client device 102) may interact with API Endpoint server 106 via HTTP GET and POST requests. The API(s) may be associated with, for example, an API management tool such as Apigee. The API(s) may be stored on the one or more memories 108 and/or executed by the one or more processors 107 of the API endpoint server 106. In some embodiments, the API(s) may be implemented as cloud-based API(s). For example, API endpoint server 106 may be located on one or more remote server(s). Such remote server(s) may be operated by a third-party (e.g., Amazon Web Services (AWS)).

The network diagram 100 may also include a delivery service server 120 configured to communicate with other components of network diagram 100 via network(s) 104. Delivery service server 120 may be associated, for example, with the retailer associated with retail store 110. In one embodiment, for example, the delivery service may be employees or service personnel employed by the retailer to deliver products (e.g., prescription drugs) to end users. In such an embodiment, the retailer may maintain a fleet of delivery vehicles (e.g., vehicle 118) and/or personnel to deliver such products. Alternatively, or in addition, delivery service server 120 may be associated with a different party than the retailer, such as a third-party delivery service provider. Delivery service server 120 may include one or more processors 121, memories 122, and/or network interfaces. Delivery service server 120 may also have one or more APIs. The API(s) may be, for example, Representational State Transfer (REST) API(s). In some embodiments, the API(s) may be implemented as cloud-based API(s).

The network diagram 100 may further include a mobile delivery vehicle 118. Mobile delivery vehicle 118 may have an operator. The operator may be an individual, such as a driver. The operator of mobile delivery vehicle 118 and/or mobile delivery vehicle 118 may have an electronic device (e.g., a mobile device such as an mobile phone or tablet running on any of an iOS or Android platform) configured to communicate with other components of network diagram 100 via network(s) 104. Mobile delivery vehicle 118 may be any vehicle suitable for transporting a delivery from one location to another, such as from a retail store to a destination designated by a user of the client device 102. For example, mobile delivery vehicle 118 may be a car, van, truck, motorcycle, scooter, bicycle, etc. The operator of mobile delivery vehicle 118 may be associated, for example, with the retailer associated with retail store 110. Alternatively, or in addition, the operator of mobile delivery vehicle 118 may be associated with a different party than the retailer. For example, the operator of mobile delivery vehicle 118 may be associated with a delivery service provider such as Deliv. The delivery service provider may be associated with delivery service server 120. The retailer may contract with or hire the delivery service provider to perform deliveries of the retailer's products. For example, the operator of mobile delivery vehicle 118 may, in accordance with an agreement with the delivery service provider, pick up a product at retail store 110 and deliver it to a destination designated by a user that has requested a delivery event from the retailer using client device 102.

The network diagram 100 may also include an SMS webpage server 114 configured to communicate with other components of network diagram 100 via network(s) 104. SMS webpage server 114 may be associated with a retailer, such as a pharmaceutical store chain, associated with retail store 110. SMS webpage server 114 may include one or more processors 115, memories 116, and/or network interfaces. In some embodiments, SMS webpage server 114 may implement client-server platform implementing, for example, Node.js, Java Server Pages (JSP), ASP.NET, etc.

The network diagram 100 may further include an SMS delivery component 124 communicatively coupled to network(s) 104. SMS delivery component 124 may include one or more servers, processors, memories, and/or network interfaces. SMS delivery component 124 may be configured to transmit communications via network(s) 104 to electronic devices such as the client device 102, as described below. SMS delivery component 124 may be configured to transmit a communication as an email, SMS message, multimedia messaging service (MMS) message, or any other such form of electronic communication.

SMS delivery component 124 may include an SMS layer 125 also communicatively coupled to network(s) 104. SMS layer 125 may be configured to receive content from a plurality of sources, including, for example, SMS webpage server 114, and to transmit communications based on the content. For example, as described below, SMS layer 125 may receive a description of an update to a delivery status state of a delivery event from SMS webpage server 114 and transmit a communication including the description to a client device 102 associated with the delivery event. In addition, SMS layer 125 may receive a description of a separate event, such as a notification that a prescription is ready to be refilled, and may transmit a communication including the description to a client device associated with the prescription.

SMS delivery component 124 may also utilize a third-party SMS delivery component 126 communicatively coupled to network(s) 104 in order to transmit the communication to client device 102. Third-party SMS delivery component 126 may be associated with a different party from SMS layer 125 or from the other components of network diagram 100. For example, SMS layer 125 may transmit a communication to third-party SMS delivery component 126. Third-party SMS delivery component 126 may then transmit the communication via the network(s) 104 to, for example, client device 102. In some embodiments, third-party SMS delivery component 126 may be provided by a mobile marketing service such as 3Cinteractive. In such embodiments, third-party delivery component 126 may be a software development kit (SDK) or API that is compiled with, or assessed from, any of SMS webpage server 114, delivery service server 120, and/or other server or software component as described herein. In some embodiments, third-party SMS delivery component 126 may rely on cloud-based mobile messaging platform Switchblade.

Figure 2:
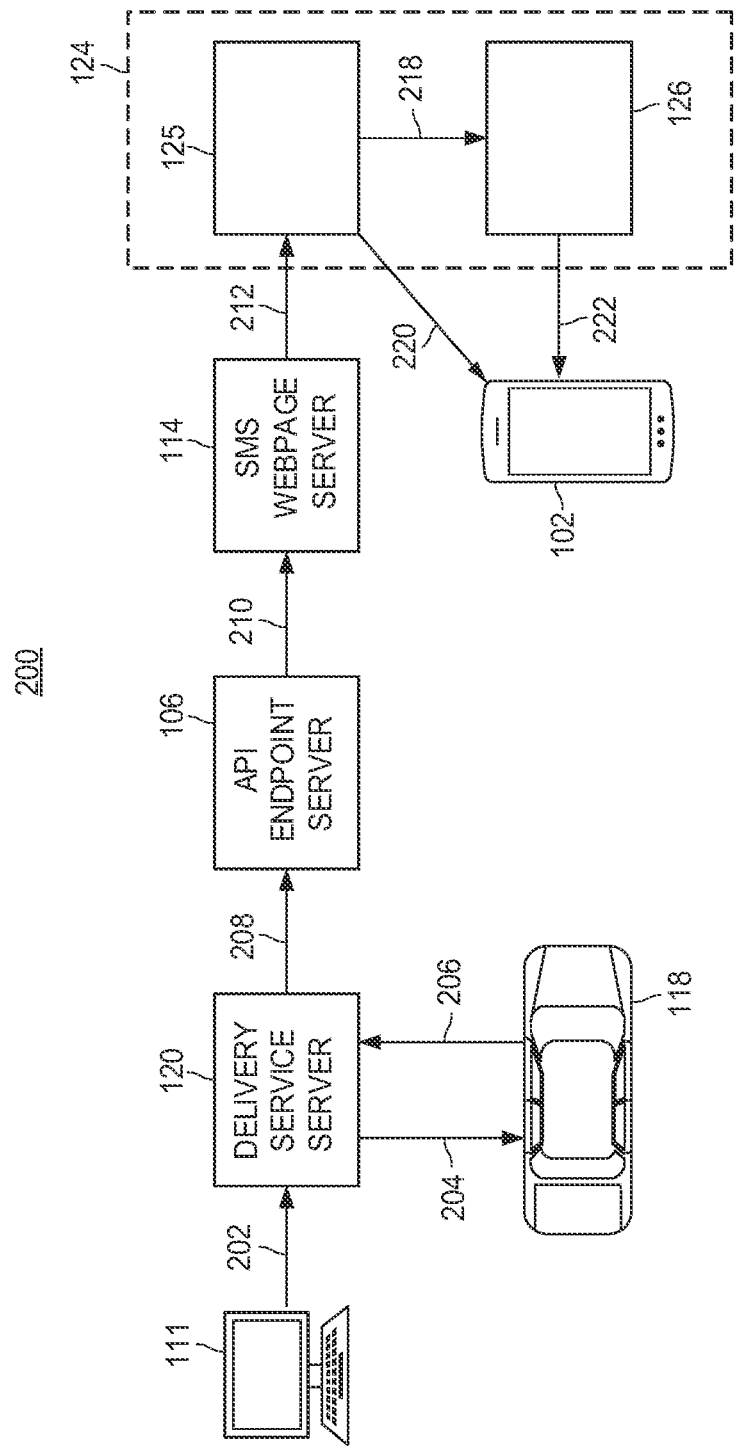
FIG. 2 illustrates an example flow diagram depicting a push-based communications system transmitting a plurality of push-based communications in accordance with various embodiments disclosed herein.

FIG. 2 illustrates an example flow diagram depicting a push-based communications system transmitting a plurality of push-based communications in accordance with various embodiments. The flow diagram 200 may begin when computer 111 transmits a request for a delivery event to delivery service server 120 (block 202). A delivery event may be, for example, an order for a delivery of a product from a retail store 110 (e.g., an order to deliver a prescription drug from a pharmacy). In particular, the delivery event could be an order for a same-day delivery of a product from a retail store 110, i.e. a delivery delivered to a user on the same day the request for a delivery event is made.

The computer 111 may be associated with retail store 110, such as a pharmacy of a pharmaceutical store chain. The delivery event may be initiated by an employee of the retail store 110 following a request made by an electronic device operated by a user. For example, a user utilizing an electronic device, such as client device 102, may interact with the electronic device to request a delivery event from retail store 110. In response to this request, computer 111 may be utilized by an employee of retail store 110 to transmit a request for a delivery event to a delivery service server 120. For instance, a user may use an electronic device to fill a prescription at a pharmacy. The user may utilize, for example, a user interface such as an application (app) or website provided by the pharmacy in order to interact with the pharmacy and fill their prescription. The user may indicate that they would like to request a delivery event and/or a same-day delivery event. Such indication may follow an inquiry from the pharmacy asking the user if they would be interested in receiving a delivery and/or same-day delivery. The user may request a delivery event for a delivery of, for example, a prescription, an over-the-counter medicine, a controlled substance, or any other product sold by the pharmacy. The user may designate a destination where they would like the product to be delivered. The user may also designate a phone number or email address associated with a client device, such as client device 102. Client device 102 will be associated with the delivery event and will be the client device to which communications concerning the delivery event are transmitted. Client device 102 may be different from the electronic device utilized by the user to request the delivery event. An employee of the pharmacy, such as a pharmacist, may fill the prescription and request a delivery event in accordance with the user's request for a delivery event. In order to request the delivery event, the employee of the pharmacy may interact with a user interface such as an app or website provided by delivery service server 120 or by the delivery service provider associated with delivery service server 120.

In some embodiments, the user, e.g., interacting with client device 102, may send a request for a delivery event directly to delivery service server 120. In such embodiments, an employee of the retail location (e.g., pharmacy) would not need to input information on the user's behalf. In some aspects, the information submitted by the user may also be transmitted to one or more servers associated with the retailer, e.g., for record keeping purposes or other data sharing purposes.

Delivery service server 120 transmits the delivery event to an operator of a mobile delivery vehicle 118 (block 204). The operator of mobile delivery vehicle 118 may accept the delivery event. For example, the operator of mobile delivery vehicle 118 may receive on an electronic device a notification of a delivery event and the operator may agree to complete the delivery event. Delivery service server 120 may receive updates of the delivery status state from the electronic device of the operator of mobile delivery vehicle 118 via network(s) 104 (block 206).

Delivery service server 120 is also provided with a webhook associated with the delivery event. In some embodiments, a webhook may be an HTTP-based callback, which may include a uniform resource locator (URL) proving a network address at which to send push-based notifications. For example, a webhook may be provided to software application A by software application B. When an event occurs, software application B may push data to a webhook URL where software application A may receive the pushed data. For example, in various embodiments described herein, the webhook may be provided to delivery service server 120 by a push-based API of the API endpoint server 106.

Flow diagram 200 includes API endpoint server 106 as described herein for FIG. 1. API endpoint server 106 may have a push-based API. Push-based API 106 may be associated with the webhook provided to the delivery service server 120. For instance, push-based API 106 may provide the webhook to delivery service server 120. Following an update to a delivery status state of a delivery event, a webhook-push may be pushed to the API endpoint server 106 from delivery service server 120 via the webhook (block 208).

The webhook-push may include a data structure, or data format. The data structure, or data format, may be, for example, implemented in the JavaScript Object Notation (JSON), extensible Markup Language (XML), or via some other similar data structure or format for holding information concerning a delivery event. The webhook-push may include information associated with the delivery event such as: a delivery event identification (e.g., a number or combination of numbers and letters), a delivery event tracking code, a delivery status state, estimated pickup time, estimated delivery time, information describing the operator of mobile delivery vehicle 118 and/or mobile delivery vehicle 118, information describing the user associated with the client device 102 that requested a delivery event, information about the product being delivered in accordance with the delivery event, and the like. An estimated pickup time, for example, may describe the time the operator of mobile delivery vehicle 118 expects to arrive at the retail store 110 and estimated delivery time may describe the time the operator of mobile delivery vehicle 118 expects to arrive at the destination designated by the user associated with client device 102.

In various embodiments, the delivery status state may be one of: "assigned" (e.g., when a delivery event is assigned to an operator of a mobile delivery vehicle 118), "in transit" (e.g., when the product being delivered in accordance with the delivery event has been picked up by the operator), "delivered" (e.g., when the product has reached its destination), returned (when the product has returned to retail store 110), "canceled" (e.g., when the delivery event has been canceled), or "operator arrived at origin" (e.g., when the operator has arrived at retail store 110, for example, to pick up the product for the delivery associated with the delivery event). Specifically, in various embodiments described herein, the code designation for the delivery status state may be, for example, "assigned," "in_transit," "delivered," "returned," "canceled," or "driver_arrived_at_origin," as can be seen in the Computer Program Listing 1 below. It is to be understood, however, that these delivery status states are representative and that greater or fewer numbers of delivery status states, and/or different deliver status states, are contemplated herein in accordance with the various disclosed systems and methods. An update to the delivery status state occurs whenever the delivery status state changes. The update to the delivery status state may, for example, be associated with a change in a geographic location of the product, mobile delivery vehicle 118, or the operator of mobile delivery vehicle 118.

In some embodiments, the delivery status state may be changed by the operator of mobile delivery vehicle 118 using an electronic device. The operator of mobile delivery vehicle 118 may, for example, utilize an electronic device (e.g., a mobile phone) to interact with a user interface, such as an application (app) or website, of the delivery service provider associated with delivery service server 120 in order to indicate that the delivery status state should be changed. For example, when the operator of mobile delivery vehicle 118 has picked up a product associated with the delivery event from retail store 110, the operator may indicate this change that the delivery status state should be changed to "in_transit" by interacting with the user interface. When an update to the delivery status state occurs, a webhook-push including the delivery status state is pushed from delivery service server 120 to API endpoint server 106, in accordance with the embodiments described herein. In some embodiments, the delivery status state may also change without a manual update made by the operator of mobile delivery vehicle 118. For example, the delivery service provider may need to cancel a delivery event in response to a request from the user or other need. The delivery service provider may change the delivery status state to "canceled." Such an update to the delivery status state would result in a webhook-push pushed from delivery service server 120 to API endpoint server 106. In further embodiments, the delivery service provider may receive updates associated with a change in a geographic location of the product, mobile delivery vehicle 118, and/or operator of mobile delivery vehicle 118 and the delivery status state may be changed to reflect the change in geographic location. The delivery status state may be updated based on changes in the geographic location of the product, mobile delivery vehicle 118, and/or operator of the mobile delivery vehicle 118. For example, mobile delivery vehicle 118, or the electronic device of the operator of mobile delivery vehicle 118, may be global positioning system (GPS)-enabled such that a change in location may cause an update in the delivery status state. As a specific example, when GPS location of the mobile delivery vehicle 118 is similar to that of the address of the user who made a delivery event request, the delivery status state may change to "driver_arrived_at_origin."

Information describing the operator of mobile delivery vehicle 118 and/or mobile delivery vehicle 118 associated with the delivery event may include: a name of the operator, a URL associated with an image of the operator, an identification code or identifier for the operator, a location of the operator and/or mobile delivery vehicle 118, for example, in latitude and longitude, and/or the make, model, color, year, and type of the mobile delivery vehicle 118.

Flow diagram 200 includes an SMS webpage server 114 configured to receive the webhook-push. The webhook-push is pushed to the SMS webpage server from the API endpoint server 106 (block 210). In some embodiments, the webhook-push may be pushed to SMS webpage server 114 from API endpoint server 106 via the push-based API.

SMS webpage server 114 may be configured to generate a description of the update to the delivery status state. The description of the update to the delivery status state may comprise text describing an event that has occurred resulting in the change to the delivery status state. For example, if the delivery status state changes to "assigned," the description of the update to the delivery status state may read, "[Sender]: [Operator name] has been assigned to deliver your package." The sender may be identified as, for example, the retailer or retail store 110 associated with the delivery event. For example, if the retailer is Walgreens, the sender may be identified as "Walgreens Rx." The delivery status state is updated in accordance with changes in the status of a delivery event, such as changes in the geographic location of the operator of mobile delivery vehicle 118. For example, in one embodiment, the computer program listing reproduced below may be used to generate the description of the update to the delivery status state.

```
case "delivery.assigned":
return "Walgreens Rx: "+driver.name+" has been assigned to deliver your package.";
break;
case "delivery.driver_arrived_at_origin":
return "Walgreens Rx: "+driver.name+", has just arrived at the store to pick up your package.";
break;
case "delivery.in_transit":
return "Walgreens Rx: Your package has been picked up and is on the way to the delivery destination. [website address]/deliv_webhook/d/"+trackingID;
break;
case "delivery.delivered":
return "Walgreens Rx: "+driver.name+", has delivered your package.";
break;
case "delivery.returned":
return "Walgreens Rx: "+driver.name+" has returned your package. Please contact your pharmacist at "+store_num+" to schedule a new delivery.";
break;
case "delivery.canceled":
return "Walgreens Rx: "+driver.name+" has cancelled your delivery. Please contact your pharmacist at "+store_num+" to schedule a new delivery.";
break;
```
Computer Program Listing 1

Figure 4:
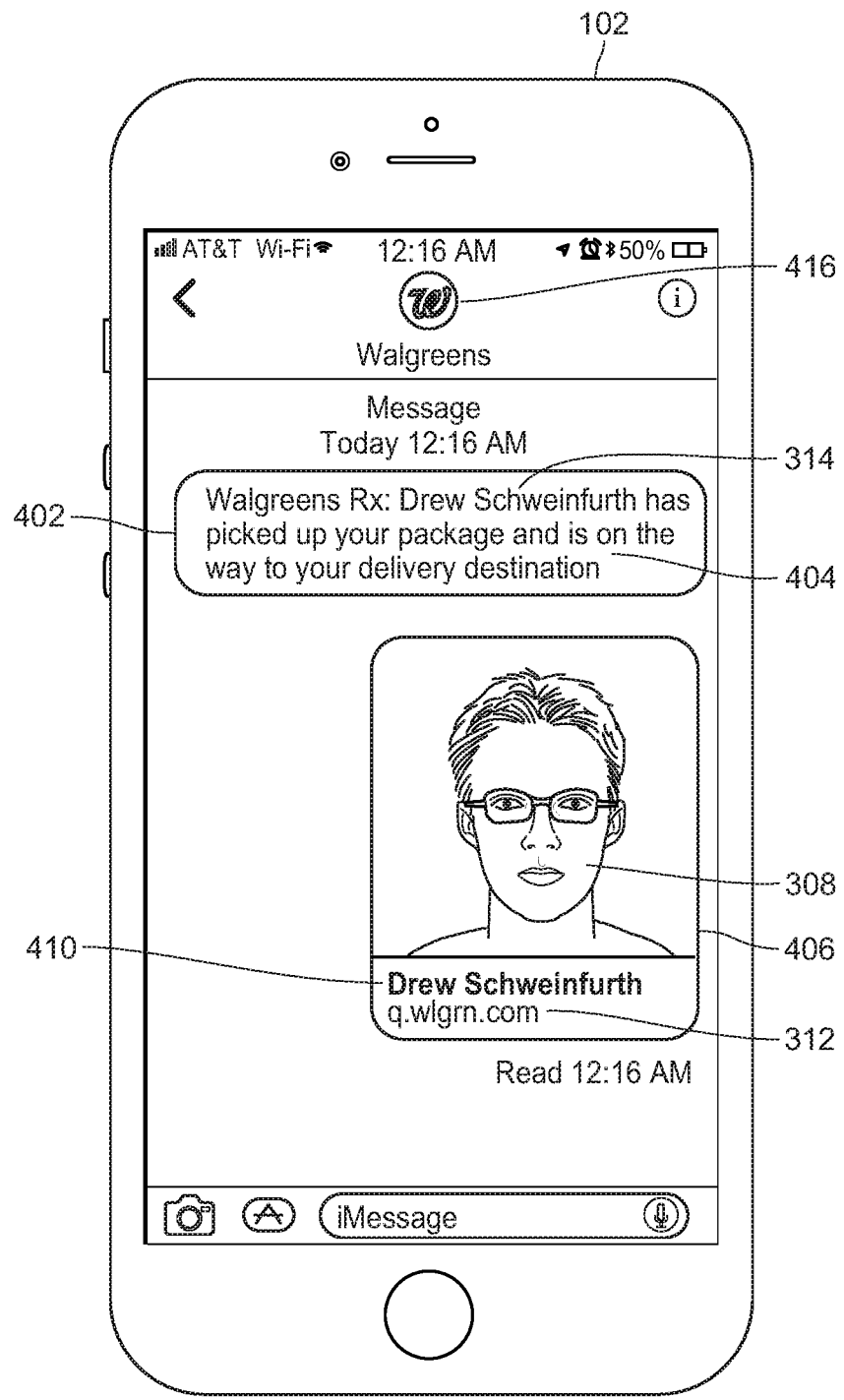
FIG. 4 illustrates an embodiment of the client device of FIG. 1 displaying an example communication.

The above example computer program listing lists several switch statements. If the delivery status state is changed, the switch statements will determine a corresponding description of the update to the delivery status state that will be generated by SMS webpage server 114 following its reception of the webhook-push containing the changed delivery status state. For example, if the delivery status state is changed to "delivered," the generated description of the update to the delivery status state, as determined by the switch statement, will be "[Sender]: [Operator name] has delivered your package." FIG. 4 depicts a client device 102 displaying an example communication 402 including an example description 404 of the update to the delivery status state and will be explained in more detail below.

In various embodiments, the description of the update to the delivery status state may include further contextual information concerning the delivery event. This further contextual information concerning the delivery event may include, in any combination, any information included within the webhook-push, such as name or identifier of the operator of mobile delivery vehicle 118, estimated delivery time, estimated pickup time, etc.

In some embodiments, SMS webpage server 114 may be further configured to generate an SMS-based webpage based on the webhook-push, the SMS-based webpage having a URL. To generate the SMS-based webpage, SMS webpage server 114 may be configured to utilize HTML templates. For example, the SMS-based webpage may be generated utilizing Embedded JavaScript (EJS) templates. The description of the update to the delivery status state may include the URL of the SMS-based webpage. For example, if the delivery status state changes to "in_transit," a webhook-push including a delivery status state "in_transit" will be pushed from delivery service server 120 to API endpoint server 106. The webhook-push will then be pushed from the API endpoint server 106 to SMS webpage server 114. SMS webpage server 114 will generate, using Computer Program Listing 1, for example, a description of the update to the delivery status state. The description may read: "[Sender]: Your package has been picked up and is on the way to the delivery destination. [URL of the SMS-based webpage]."

Figure 3:
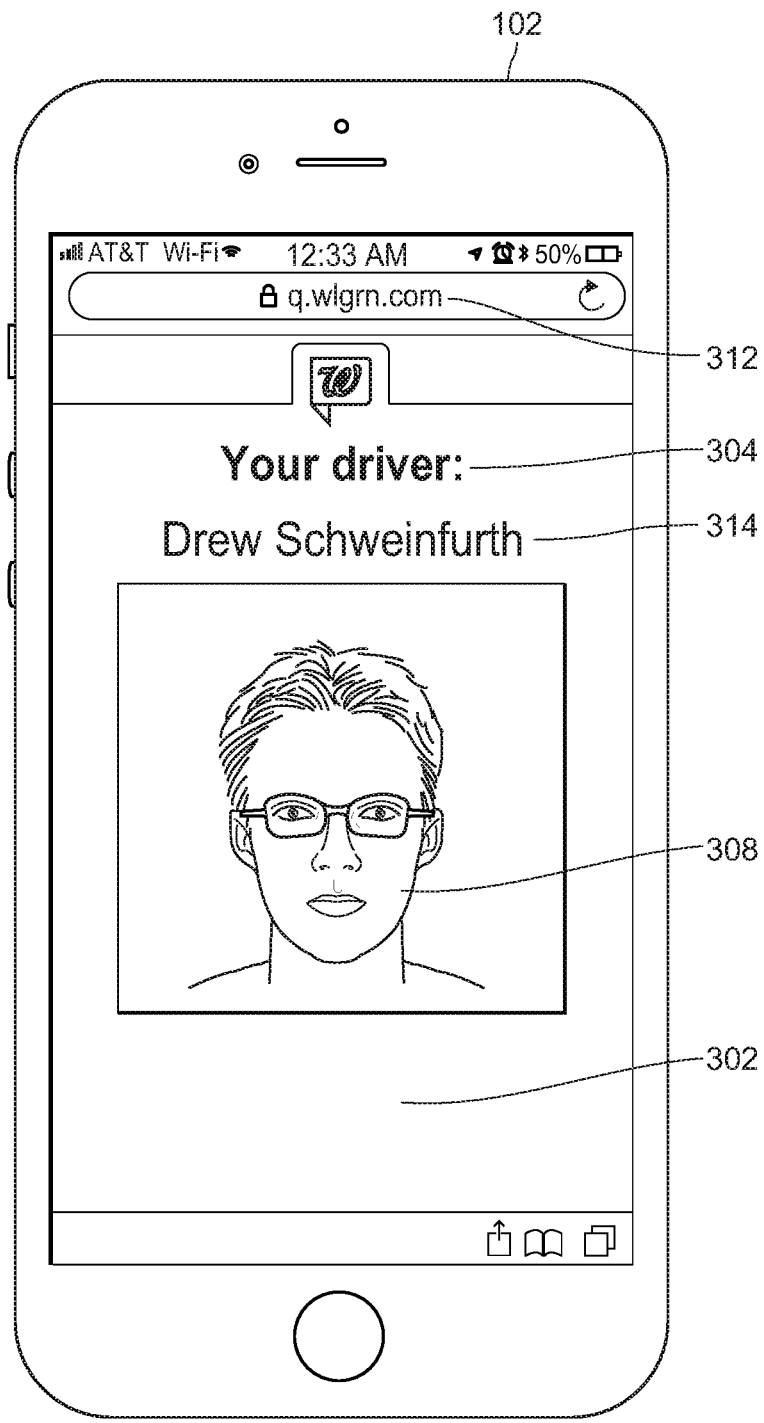
FIG. 3 illustrates an embodiment of the client device of FIG. 1 displaying an example SMS-based webpage.

FIG. 3 illustrates an embodiment of the client device 102 displaying an example SMS-based webpage 302. SMS-based webpage 302 has a URL which may be displayed at the top of client device 102 when client device 102 displays the SMS-based webpage 302, such as example URL 312. The SMS-based webpage 302 may include a header 304. Header 304 may include text in accordance with the information displayed on SMS-based webpage 302. For example, if SMS-based webpage 302 displays information about the operator of the mobile delivery vehicle 118, header 304 may read "Your driver:". SMS-based webpage 302 may display information about the operator of the mobile delivery vehicle, such as an example name 314 of the operator and/or an example image 308 of the operator depicted in FIG. 3. SMS-based webpage 302 may include the description of the update to the delivery status state. In further embodiments, SMS-based webpage 302 may include, in any combination, any information included within the webhook-push, such as the delivery status state, name or identifier of the operator of mobile delivery vehicle 118, estimated delivery time, etc. It is to be understood that SMS-based webpage 302 is an example embodiment and that more or less information may be included in an SMS-based webpage.

The SMS-based webpage may be configured to include a plurality of meta tags. The meta tags may be, for example, open graph tags such as "og:title," "og:type," "og:url," and "og:image," as can be seen in Computer Program Listing 2 below. When a browser or operating system of a client device 102 displays a communication containing a URL for an SMS-based webpage with meta tags, the browser or operating system may display a preview of the SMS-based webpage in accordance with the meta tags instead of or in addition to the text of the URL of SMS-based webpage 302. For example, "og:title" may indicate a desired preview title of the webpage to be displayed in the preview; "og:type" may indicate the type of content to be displayed in the preview, such as an image; "og:url" may designate the URL for the webpage associated with the preview, such as the URL of the SMS-based webpage; "og:image" may comprise a URL for an image to be displayed in the preview. An example preview 406 is depicted in FIG. 4 and will be described below.

SMS-based webpage 302 may be generated, for example, by the computer program listing included below:

```
<!DOCTYPE html>
<html>
<head>
<title><%=title %></title>
<meta property="og:title" content="<%=title %>"/>
<meta property="og:type" content="imagejpeg"/>
<meta property="og:url" content="<%=url %>"/>
<meta property="og:image" content="<%=image %>"/>
<meta charset="utf-8">
<meta http-equiv="X-UA-Compatible" content="IE=edge">
<meta name="viewport" content="width=device-width, initial-scale=1, maximum-scale=1, user-scalable=no">
<meta name="description" content="Error Finding Driver Info">
<meta name="author" content="@ aBigSchwein">
<link rel="stylesheet" type="text/css" href="../style sheets/bootstrap.min.css"/>
<link rel="stylesheet" type="text/css" href="../style sheets/main.css"/>
<script type="text/javascript" src="../js/jquery.min.js"></script>
<script type="text/javascript" src="../js/bootstrap.min.js"></script>
</head>
<body>
<nav class="navbar navbar-default navbar-static-top">
<div class="container-fluid">
<div class="navbar-header">
<div class="navbar-img">
<img alt="Walgreens" src="../img/logo.png">
</div>
</div>
</div>
</nav>
<div style="text-align:center;" class="col-sm-6 col-sm-offset-3">
<h1 class="red">Your driver:</h1>
<h2><%=title %></h2>
<div style="margin:0px Auto; text-align:center;">
<img style="margin:0px Auto; text-align:center; max-width:300px;" class="thumbnail" src="<%=image %>" alt="<%=title %>"/>
</div>
</div>
</body>
</html>
```

Computer Program Listing 2

Referring to FIG. 2, SMS webpage server 114 may be further configured to transmit the description of the update to the delivery status state to an SMS delivery component 124 (block 212). In some embodiments, the description may include the URL of the SMS-based webpage. In various embodiments, SMS webpage server 114 may be further configured to transmit a phone number or email address associated with client device 102 associated with the delivery event to SMS delivery component 124. SMS delivery component 124 may be configured to transmit a communication, the communication including the description of the update to the delivery status state to client device 102 (block 220 or 222), where client device 102 is associated with the delivery event. The communication may be, for example, an email, SMS message, MMS message, or any other form of electronic communication. In some embodiments, the communication may be transmitted to client device 102 using the phone number or email address transmitted to SMS delivery component 124 from SMS webpage server 114. SMS delivery component 124 may be further configured to transmit the communication to client device 102 via a secure channel. In some embodiments, the communication may be encrypted.

As described with respect to FIG. 1, SMS delivery component 124 may include an SMS layer 125, a third-party SMS delivery component 126, or both. SMS layer 125, for example, may be configured to receive from SMS webpage server 114 the description of the update to the delivery status state, which may include the URL of the SMS-based webpage. SMS layer 125 may generate and transmit a communication including the description of the update to the delivery status state to a client device 102 associated with the delivery event (block 220).

In other embodiments, SMS layer 125 may transmit the communication including the description to a third-party SMS delivery component 126 (block 218). Third-party SMS delivery component 126 may also receive the description of the update of the delivery status state from SMS webpage server 114 or SMS layer 125 and generate a communication including the description. Third-party SMS delivery component 126 may transmit the communication including the description via the network(s) 104 to, for example, client device 102 (block 222).

FIG. 4 illustrates an embodiment of client device 102 displaying an example communication 402. In the embodiment illustrated in FIG. 4, example communication 402 is an SMS message displayed on a client device 102 having an Apple iOS operating system. Client device 102 may display a name and/or logo 416 of the retailer associated with the delivery event as the sender of the communication. Example communication 402 includes an example description 404 of the update to the delivery status state (e.g., "Walgreens Rx: Drew Schweinfurth has picked up your package and is on the way to your delivery destination. [example URL 312].," where "Drew Schweinfurth" is an example operator name 314). Example description 404 includes example URL 312 of the example SMS-based webpage 302. In the example depicted in FIG. 4, communication 402 may have been transmitted to the client device 102 following an update to the delivery status state wherein the delivery status state changed to "in_transit."

If example SMS-based webpage 302 is configured to include a plurality of meta tags and the description of the update to the delivery status state includes URL 312 of SMS-based webpage 302, when client device 102 displays the communication 402, URL 312 of SMS-based webpage 302 may be displayed not solely as text, but as text within a preview 406 of the SMS-based webpage. Preview 406 includes a preview title 410 and preview of operator image 308 in accordance with the meta tags. For instance, in the embodiment depicted, one of the meta tags, "og:image,"

corresponds to a URL of an example image 308 of the operator of mobile delivery vehicle 118. Further, in the embodiment, in accordance with preview 406, example SMS-based webpage 302 also has meta tags og:title corresponding to "Drew Schweinfurth," og:type corresponding to "image," and og:url corresponding to example URL 312 of SMS-based webpage 302.

Figure 5:
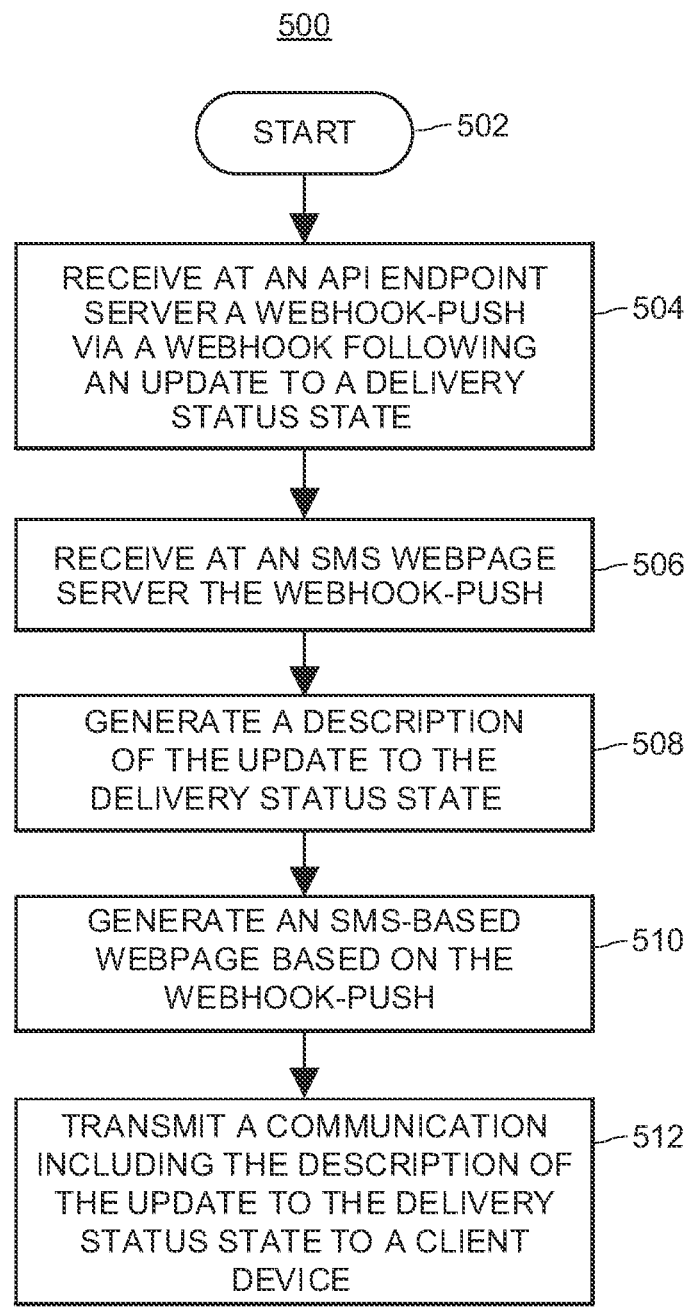
FIG. 5 illustrates a flow diagram of an example push-based communications method.

FIG. 5 illustrates a flow diagram of an example push-based communications method, in accordance with the embodiments described herein. Method 500 may begin (block 502) where an API endpoint server (e.g., API endpoint server 106), at block 504, receives a webhook-push via a webhook following an update to a delivery status state. API endpoint server 106 has a push-based API that is associated with a webhook provided to a delivery service server (e.g., delivery service server 120). In some embodiments, for example, the webhook is provided to the delivery service server by the push-based API. The webhook-push is pushed via the webhook from delivery service server 120 to API endpoint server 106. At block 506, an SMS webpage server (e.g., SMS webpage server 114) may receive the webhook-push pushed to the SMS webpage server from API endpoint server 106. In some embodiments, the webhook-push is pushed to the SMS webpage server from the API endpoint server via the push-based API.

At block 508, SMS webpage server 114 may generate a description of the update to the delivery status state. In some optional embodiments, SMS webpage server 114 may generate an SMS-based webpage having a URL (block 510). In such embodiments, the description of the update to the delivery status state may include the URL of the SMS-based webpage. At block 512, an SMS delivery component (e.g., SMS delivery component 124) transmits a communication, the communication including the description of the update to the delivery status state, to a client device, the client device associated with the delivery event.

In addition, the delivery event may be initiated following a prediction determining that a user associated with client device 102 is interested in receiving a delivery. For example, the user may be a customer of a retailer. The retailer may predict that the user may be interested in a delivery and/or a same-day delivery. In some embodiments, the retailer may predict that it would be profitable for the retailer to offer delivery and/or same-day delivery to the user. Following the prediction determining that the user is interested in and/or profitable for a delivery and/or same-day delivery, the retailer may communicate with the user to determine if the user would like to request a delivery event. The user may then request a delivery event and receive communications concerning the delivery event in accordance with the embodiments herein.

The prediction may be determined using a rules-based approach, a machine-learning approach, or a combination thereof. For example, the prediction may be based on a combination of variables such as the user's address, the user's proximity to a retail store of the retailer, whether the user has previously requested a delivery event, whether the user has previously requested a same-day delivery event, the age of the user, and the products the user has previously purchased or requested. For example, if the retailer is a pharmaceutical store chain, the prediction may be based on the time the prescription is filled or will likely be filled. In a rules-based approach, the prediction may be made if a particular Boolean condition is met or if a certain plurality of Boolean conditions are met. For example, if a user has previously requested a same-day delivery event, a particular Boolean condition concerning past behavior may be "true." Based on this, a prediction may be made that the user is likely interested in a same-day delivery.

In a machine learning approach, a prediction may be made based on the result of a machine learning algorithm, wherein the algorithm takes as input a combination of variables such as those described above. For example, a machine learning component may be implemented on a server or other computing device, e.g., any of the servers described herein such as SMS webpage server 114. The machine learning component may be trained using a supervised or unsupervised machine learning program or algorithm. The machine learning program or algorithm may employ a neural network, which may be a convolutional neural network, a deep learning neural network, or a combined learning module or program that learns in two or more features or feature datasets in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. Machine learning may involve identifying and recognizing patterns in existing data (such past transactions with users involving same-day-delivery, proximity of a user to a retail location, prescription drug product to be delivered, etc.) in order to facilitate making predictions for subsequent data (to predict whether a certain user would like to engage in same-day-delivery service(s) as described herein).

Machine learning model(s), such as those the machine-learning component described above, may be created and trained based upon example (e.g., "training data,") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

In machine-learning based embodiments herein, label data may be data indicating whether a user has requested same-day delivery in the past and feature training data may include data such proximity of a user to a retail location, prescription drug product to be delivered, age of user, or other similar information.

In an example embodiment, the retailer may be a pharmaceutical store chain. A pharmacy of the pharmaceutical store chain may fill a prescription in accordance with a prescription request from a user. If the pharmaceutical store chain has predicted that the user may be interested in and/or profitable for a delivery and/or same-day delivery, the pharmaceutical store chain may communicate with the user via an electronic message, such as an SMS message, MMS message, or email. The communication may ask the user whether the user would be interested in receiving their filled prescription via a delivery or same-day delivery. The communication may offer delivery to the user, and the user may be able to respond to the communication (e.g., by replying "Yes" or "No" to the communication) and request a delivery event. Communications concerning the delivery event may then be transmitted to the user in accordance with the embodiments herein. In some embodiments, the pharmaceutical store chain may need to engage in further communications with the user in order to, for example, confirm information about the prescription or delivery event, authorize delivery charges, request and/or receive a picture of an updated insurance card, and the like.

ADDITIONAL CONSIDERATIONS

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A push-based communications system configured to transmit a plurality of push-based communications associated with products moving geographically, the push-based communications system comprising:
   an application programming interface (API) endpoint server having a push-based API, the push-based API associated with a webhook provided to a delivery service server, the API endpoint server configured to receive a webhook-push pushed to the API endpoint server from the delivery service server via the webhook following an update to a delivery status state of a delivery event, the webhook-push including information associated with the delivery event;
   a short message service (SMS) webpage server configured to receive the webhook-push, the webhook-push pushed to the SMS webpage server from the API endpoint server, and the SMS webpage server configured to generate a description of the update to the delivery status state and to generate an SMS-based webpage based on the information included in the webhook-push, the SMS-based webpage comprising an image of an operator of a mobile delivery vehicle associated with the delivery event; and an SMS delivery component configured to transmit a communication, the communication including the description of the update to the delivery status state, to a client device, the client device associated with the delivery event.

2. The push-based communications system of claim 1, wherein the description of the update to the delivery status state includes a uniform resource locator (URL) of the webpage.

3. The push-based communications system of claim 1, wherein the SMS-based webpage is configured to include a plurality of meta tags and the communication, when displayed by the client device, includes a preview of the SMS-based webpage in accordance with the plurality of meta tags.

4. The push-based communications system of claim 3, wherein the preview of the SMS-based webpage includes the image of the operator of the mobile delivery vehicle.

5. The push-based communications system of claim 1, wherein the webhook is provided to the delivery service server by the push-based API.

6. The push-based communications system of claim 1, wherein the delivery event is associated with a delivery of a product and the update to the delivery status state is associated with a change in a geographic location of the product.

7. The push-based communications system of claim 1, wherein the delivery status state is one of: assigned, in_transit, delivered, returned, canceled, or driver_arrived_at_origin.

8. The push-based communications system of claim 1, wherein the delivery event is associated with a same-day delivery event.

9. The push-based communications system of claim 1, wherein the delivery event is associated with a delivery of a prescription.

10. A push-based communications method for transmitting a plurality of push-based communications associated with products moving geographically, the push-based communications method comprising:

receiving, at an application programming interface (API) endpoint server having a push-based API associated with a webhook provided to a delivery service server, a webhook-push, wherein the webhook-push is pushed to the API endpoint server from the delivery service server via the webhook following an update to a delivery status state of a delivery event, the webhook-push including information associated with the delivery event;

receiving, at a short message service (SMS) webpage server, the webhook-push pushed to the SMS webpage server from the API endpoint server;

generating, via the SMS webpage server, a description of the update to the delivery status state and an SMS-based webpage based on the information included in the webhook-push, the SMS-based webpage comprising an image of an operator of a mobile delivery vehicle associated with the delivery event;

transmitting, by an SMS delivery component, a communication including the description of the update to the delivery status state to a client device, the client device associated with the delivery event.

11. The push-based communications method of claim 10, wherein the description of the update to the delivery status state includes a uniform resource locator (URL) of the webpage.

12. The push-based communications method of claim 10, wherein the SMS-based webpage is configured to include a plurality of meta tags and the communication, when displayed by the client device, includes a preview of the SMS-based webpage in accordance with the plurality of meta tags.

13. The push-based communications method of claim 12, wherein the preview of the SMS-based webpage includes the image of the operator of the mobile delivery vehicle.

14. The push-based communications method of claim 10, further comprising:

providing, by the push-based API, the webhook to the delivery service server.

15. The push-based communications method of claim 10, wherein the SMS delivery component transmits the communication to the client device via a secure channel.

16. The push-based communications method of claim 10, wherein the delivery event is associated with a delivery of a product and the update to the delivery status state is associated with a change in a geographic location of the product.

17. The push-based communications method of claim 10, wherein the delivery status state is one of: assigned, in_transit, delivered, returned, canceled, or driver_arrived_at_origin.

18. The push-based communications method of claim 10, wherein the delivery event is associated with a same-day delivery event.

19. The push-based communications method of claim 18, wherein the delivery event is associated with a delivery of a prescription.

20. A tangible, non-transitory computer-readable medium storing instructions for transmitting a plurality of push-based communications associated with products moving geographically that, when executed via one or more processors of a computer system, cause the computer system to:

receive, at an application programming interface (API) endpoint server having a push-based API associated with a webhook provided to a delivery service server, a webhook push, wherein the webhook-push is pushed to the API endpoint server from the delivery service server via the webhook following an update to a delivery status state of a delivery event, the webhook-push including information associated with the delivery event;

receive, at a short message service (SMS) webpage server, the webhook-push pushed to the SMS webpage server from the API endpoint server;

generate, via the SMS webpage server, a description of the update to the delivery status state and a webpage based on the information included in the webhook-push, the SMS-based webpage comprising an image of an operator of a mobile delivery vehicle associated with the delivery event;

transmit, by an SMS delivery component, a communication including the description of the update to the delivery status state to a client device, the client device associated with the delivery event.

* * * * *